(12) United States Patent
Cheng et al.

(10) Patent No.: US 11,588,796 B2
(45) Date of Patent: Feb. 21, 2023

(54) DATA TRANSMISSION WITH OBFUSCATION FOR A DATA PROCESSING (DP) ACCELERATOR

(71) Applicant: Baidu USA LLC, Sunnyvale, CA (US)

(72) Inventors: Yueqiang Cheng, Sunnyvale, CA (US); Hefei Zhu, Sunnyvale, CA (US)

(73) Assignees: BAIDU USA LLC, Sunnyvale, CA (US); KUNLUNXIN TECHNOLOGY (BEIJING) COMPANY LIMITED, Beijing (CN)

( * ) Notice: Subject to any disclaimer, the term of this patent is extended or adjusted under 35 U.S.C. 154(b) by 570 days.

(21) Appl. No.: 16/568,127

(22) Filed: Sep. 11, 2019

(65) Prior Publication Data

US 2021/0075775 A1    Mar. 11, 2021

(51) Int. Cl.
*G06F 21/00*      (2013.01)
*H04L 29/06*      (2006.01)
(Continued)

(52) U.S. Cl.
CPC ........... *H04L 63/0435* (2013.01); *G06N 5/04* (2013.01); *H04L 63/18* (2013.01)

(58) Field of Classification Search
CPC . H04L 63/0435; H04L 63/18; H04L 63/0428; H04L 9/12; H04L 2209/125;
(Continued)

(56) References Cited

U.S. PATENT DOCUMENTS 10,275,851 B1    4/2019 Zhao et al.
2018/0241760 A1*  8/2018 Stephens ............. H04L 63/0428
(Continued)

FOREIGN PATENT DOCUMENTS

EP          3273380 A1      1/2018
WO     WO-2017163008 A1 *  9/2017 ......... G06F 21/6254
WO     WO-2019190886 A1 * 10/2019 ............. G06F 21/16

OTHER PUBLICATIONS

Snehalata Funde; Gandharba Swain; "Big Data Privacy and Security Using Abundant Data Recovery Techniques and Data Obliviousness Methodologies"; Oct. 2022; vol. 10; Journal Article; Publisher: IEEE; pp. 105458-105484 (Year: 2022).*

*Primary Examiner* — Shewaye Gelagay
*Assistant Examiner* — Courtney D Fields
(74) *Attorney, Agent, or Firm* — Womble Bond Dickinson (US) LLP

(57) ABSTRACT

According to one embodiment, a host communicates with a data processing (DP) accelerator using an obfuscation scheme. The DP accelerator receives an obfuscation kernel algorithm (or obfuscation algorithm), where the obfuscation kernel algorithm is used to obfuscate and de-obfuscate data in communication with a host. The DP accelerator de-obfuscates, using the obfuscation kernel algorithm, obfuscated data received from the host for a prediction request to obtain one or more AI models. The DP accelerator generates prediction results by applying the one or more AI models to a prediction input. The DP accelerator obfuscates, using the obfuscation kernel algorithm, the prediction results. The DP accelerator sends the obfuscated prediction results to the host, where the host retrieves the prediction results by de-obfuscating the obfuscated prediction results.

20 Claims, 11 Drawing Sheets

(51) Int. Cl.
  *H04L 9/40*    (2022.01)
  *G06N 5/04*    (2023.01)
  *H04W 12/02*   (2009.01)
  *G06F 21/62*   (2013.01)
(58) Field of Classification Search
  CPC ............... H04L 2209/16; G06F 21/606; G06F 21/6245; G06N 20/00; G06N 20/10; G06N 5/04
  See application file for complete search history.

(56) References Cited

U.S. PATENT DOCUMENTS

2019/0044918 A1\*  2/2019  Doshi ................. G06F 21/6245
2019/0171833 A1   6/2019  Zhang et al.
2019/0220617 A1   7/2019  Harriman et al.
2019/0354708 A1\* 11/2019  Fisher ................. G06F 16/221

\* cited by examiner

DATA TRANSMISSION WITH OBFUSCATION FOR A DATA PROCESSING (DP) ACCELERATOR

TECHNICAL FIELD

Embodiments of the invention relate generally to obscure multiparty computing. More particularly, embodiments of the invention relate to data transmission with obfuscation for a data processing (DP) accelerator.

BACKGROUND

Sensitive transactions are increasingly being performed by data processing (DP) accelerators such as artificial intelligence (AI) accelerators or co-processors. This has increased the need for securing communication channels for DP accelerators and securing an environment of a host system to protect the host system from unauthorized accesses.

For example, data transmission for AI training data, models, and inference outputs may not be protected and may be leaked to untrusted parties. Furthermore, cryptographic key-based solutions may be slow and not be practical. Thus, there is a need for a system to obscure data transmissions for DP accelerators with or without cryptography.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Figure 1:
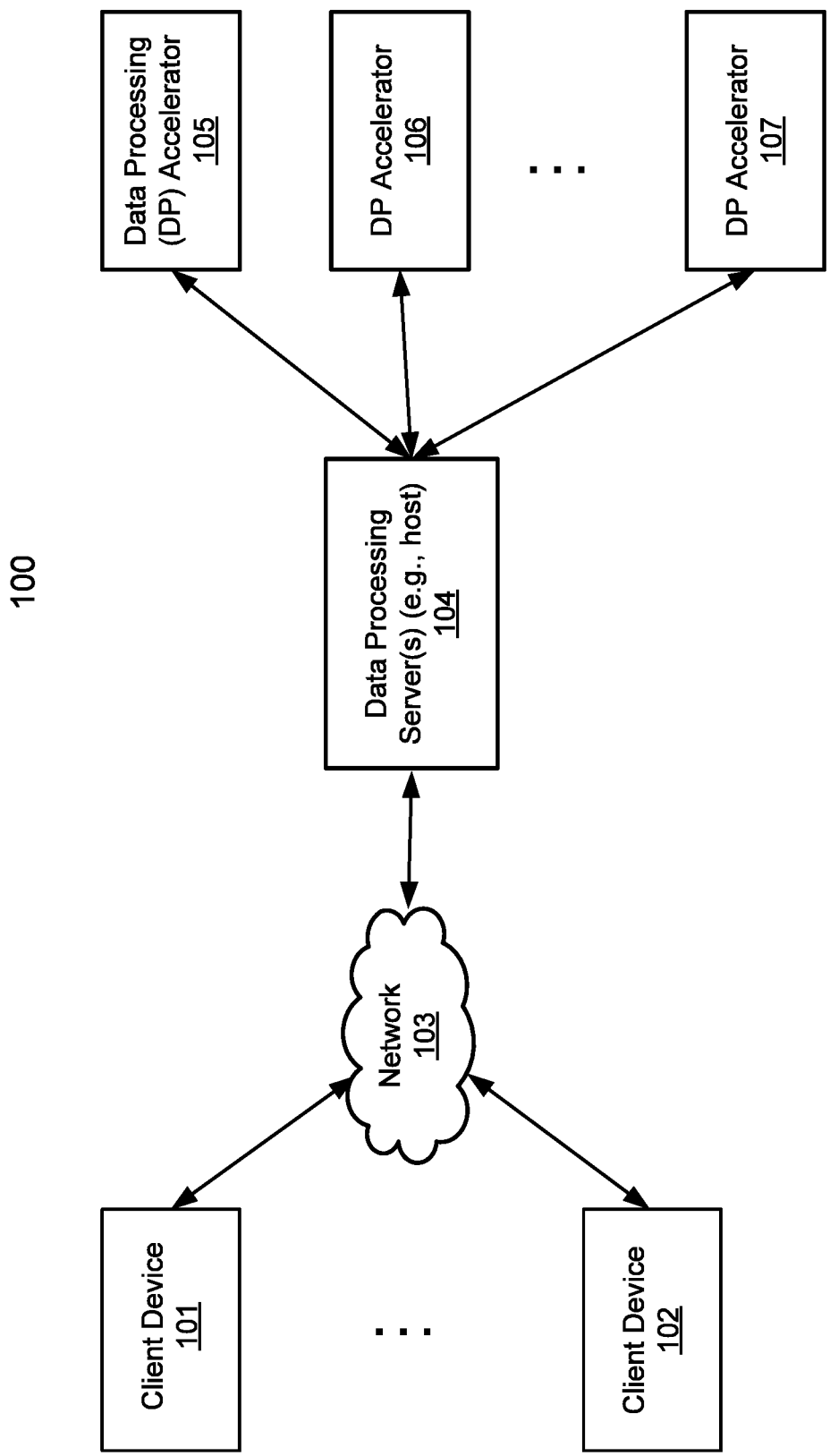
FIG. 1 is a block diagram illustrating an example of system configuration for securing communication between a host and data process (DP) accelerators according to some embodiments.

Various embodiments and aspects of the invention will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to a first aspect of the disclosure, a host communicates with a data processing (DP) accelerator using an obfuscation scheme. The DP accelerator (or system) receives an obfuscation kernel algorithm (or obfuscation algorithm), where the obfuscation kernel algorithm is used to obfuscate and de-obfuscate communication data with a host. The system de-obfuscates, using the obfuscation kernel algorithm, obfuscated data received from the host for a prediction request to obtain one or more AI models. The system generates prediction results by applying the one or more AI models to a prediction input. The system obfuscates, using the obfuscation kernel algorithm, the prediction results. The system sends the obfuscated prediction results to the host, where the host retrieves the prediction results by de-obfuscating the obfuscated prediction results.

According to a second aspect of the disclosure, a system generates a prediction request to perform an artificial intelligence (AI) prediction by a DP accelerator using one or more AI models, where the prediction request includes an obfuscated data obfuscating the one or more AI models based on an obfuscation kernel algorithm. The system sends the obfuscation kernel algorithm and the prediction request to the DP accelerator, where the obfuscated data is de-obfuscated, using the obfuscation kernel algorithm, to obtain the one or more AI models to generate prediction results, where the prediction results are obfuscated, using the obfuscation kernel algorithm, by the DP accelerator. The system receives the obfuscated prediction results from the DP accelerator. The system de-obfuscates the obfuscated prediction results to retrieve the prediction results.

According to a third aspect of the disclosure, a system receives, by a DP accelerator, a training request from a host, the training request includes an obfuscated data that includes one or more AI models and/or training input data. The system de-obfuscates, by an obfuscation unit of the DP accelerator, the obfuscated data to obtain the one or more AI models. The system trains the one or more AI models based on the training input data.

According to a four aspect of the disclosure, a system (e.g., host) generates obfuscated data by obfuscating one or more AI models and/or training input data. The system generates a training request to perform an AI model training by a DP accelerator, where the training request includes the obfuscated data. The system sends the training request to the DP accelerator, where an obfuscation unit of the DP accelerator applies an obfuscation algorithm to obtain the one or more AI models and/or training input data, where the one or more AI models is trained using the training input data.

FIG. 1 is a block diagram illustrating an example of system configuration for securing communication between a host and data process (DP) accelerators according to some embodiments. Referring to FIG. 1, system configuration 100 includes, but is not limited to, one or more client devices 101-102 communicatively coupled to DP server 104 over network 103. Client devices 101-102 may be any type of client devices such as a personal computer (e.g., desktops, laptops, and tablets), a "thin" client, a personal digital assistant (PDA), a Web enabled appliance, a Smartwatch, or a mobile phone (e.g., Smartphone), etc. Alternatively, client devices 101-102 may be other servers. Network 103 may be any type of networks such as a local area network (LAN), a wide area network (WAN) such as the Internet, or a combination thereof, wired or wireless.

Server (e.g., host) 104 may be any kind of servers or a cluster of servers, such as Web or cloud servers, application servers, backend servers, or a combination thereof. Server 104 further includes an interface (not shown) to allow a client such as client devices 101-102 to access resources or services (such as resources and services provided by DP accelerators via server 104) provided by server 104. For example, server 104 may be a cloud server or a server of a data center that provides a variety of cloud services to clients, such as, for example, cloud storage, cloud computing services, machine-learning training services, data mining services, etc. Server 104 may be configured as a part of software-as-a-service (SaaS) or platform-as-a-service (PaaS) system over the cloud, which may be a private cloud, public cloud, or a hybrid cloud. The interface may include a Web interface, an application programming interface (API), and/or a command line interface (CLI).

For example, a client, in this example, a user application of client device 101 (e.g., Web browser, application), may send or transmit an instruction (e.g., artificial intelligence (AI) training, inference instruction, etc.) for execution to server 104 and the instruction is received by server 104 via the interface over network 103. In response to the instruction, server 104 communicates with DP accelerators 105-107 to fulfill the execution of the instruction. In some embodiments, the instruction is a machine learning type of instruction where DP accelerators, as dedicated machines or processors, can execute the instruction many times faster than execution by server 104. Server 104 thus can control/manage an execution job for the one or more DP accelerators in a distributed fashion. Server 104 then returns an execution result to client devices 101-102. A DP accelerator or AI accelerator may include one or more dedicated processors such as a Baidu artificial intelligence (AI) chipset available from Baidu, Inc. or alternatively, the DP accelerator may be an AI chipset from NVIDIA, an Intel, or some other AI chipset providers.

According to one embodiment, each of the applications accessing any of DP accelerators 105-107 hosted by data processing server 104 (also referred to as a host) may verify that the application is provided by a trusted source or vendor. Each of the applications may be launched and executed within a trusted execution environment (TEE) specifically configured and executed by a central processing unit (CPU) of host 104. When an application is configured to access any one of the DP accelerators 105-107, an obscured connection can be established between host 104 and the corresponding one of the DP accelerator 105-107, such that the data exchanged between host 104 and DP accelerators 105-107 is protected against the attacks from malwares/intrusions.

Figure 2:
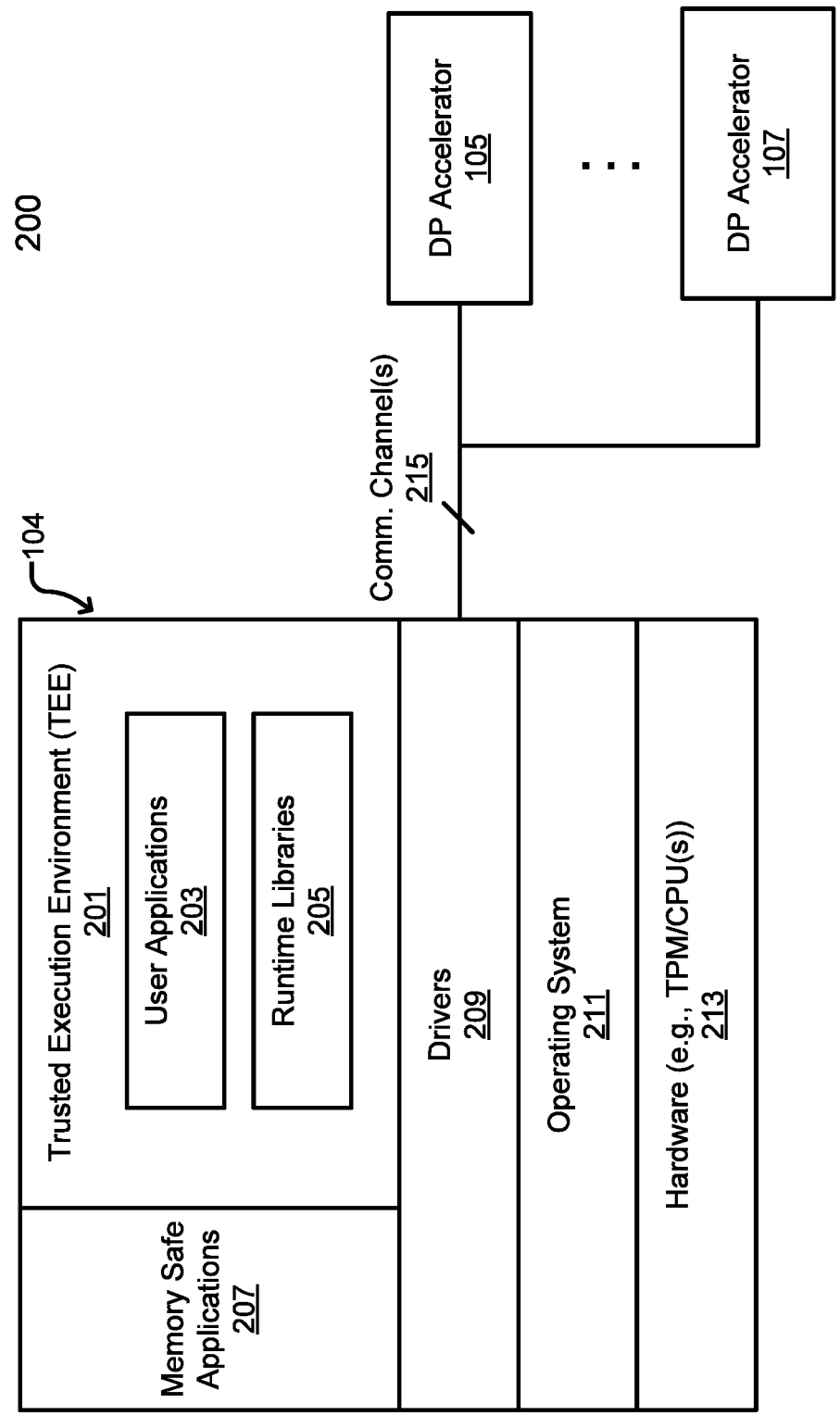
FIG. 2 is a block diagram illustrating an example of a multi-layer protection solution for obscured communications between a host and data process (DP) accelerators according to some embodiments.

FIG. 2 is a block diagram illustrating an example of a multi-layer protection solution for obscured communications between a host system and data process (DP) accelerators according to some embodiments. In one embodiment, system 200 provides a protection scheme for obscured communications between host and DP accelerators with or without hardware modifications to the DP accelerators. Referring to FIG. 2, host machine or server 104 can be depicted as a system with one or more layers to be protected from intrusion such as user application 203, runtime libraries 205, driver 209, operating system 211, and hardware 213 (e.g., security module (trusted platform module (TPM))/central processing unit (CPU)). Host machine 104 is typically a CPU system which can control and manage execution jobs on the host machine 104 or DP accelerators 105-107. In order to secure/obscure a communication channel between DP accelerators 105-107 and host machine 104, different components may be required to protect different layers of the host system that are prone to data intrusions or attacks. For example, a trusted execution environment (TEE) can protect the user application layer and the runtime library layer from data intrusions.

Referring to FIG. 2, system 200 includes host system 104 and DP accelerators 105-107 according to some embodiments. DP accelerators can include Baidu AI chipsets or any other AI chipsets such as NVIDIA graphical processing units (GPUs) that can perform AI intensive computing tasks. In one embodiment, host system 104 includes a hardware that has one or more CPU(s) 213 equipped with a security module (such as a trusted platform module (TPM)) within host machine 104. A TPM is a specialized chip on an endpoint device that stores cryptographic keys (e.g., RSA cryptographic keys) specific to the host system for hardware authentication. Each TPM chip can contain one or more RSA key pairs (e.g., public and private key pairs) called endorsement keys (EK) or endorsement credentials (EC), i.e., root keys. The key pairs are maintained inside the TPM chip and cannot be accessed by software. Critical sections of firmware and software can then be hashed by the EK or EC before they are executed to protect the system against unauthorized firmware and software modifications. The TPM chip on the host machine can thus be used as a root of trust for secure boot.

The TPM chip also secures driver 209 and operating system (OS) 211 in a working kernel space to communicate with the DP accelerators. Here, driver 209 is provided by a DP accelerator vendor and can serve as a driver for the user application to control a communication channel(s) 215 between host and DP accelerators. Because TPM chip and secure boot protects the OS and drivers in their kernel space, TPM also effectively protects the driver 209 and operating system 211.

Since communication channels 215 for DP accelerators 105-107 may be exclusively occupied by the OS and driver, thus, communication channels 215 can be secured through the TPM chip. In one embodiment, communication channels 215 include a peripheral component interconnect or peripheral component interconnect express (PCIE) channel. In one embodiment, communication channels 215 are obscured communication channels.

Host machine 104 can include trusted execution environment (TEE) 201 which is enforced to be secure by TPM/CPU 213. A TEE is a secure environment. TEE can guarantee code and data which are loaded inside the TEE to be protected with respect to confidentiality and integrity. Examples of a TEE may be Intel software guard extensions (SGX), or AMD secure encrypted virtualization (SEV). Intel SGX and/or AMD SEV can include a set of central processing unit (CPU) instruction codes that allows user-level code to allocate private regions of memory of a CPU that are protected from processes running at higher privilege levels. Here, TEE 201 can protect user applications 203 and runtime libraries 205, where user application 203 and runtime libraries 205 may be provided by end users and DP accelerator vendors, respectively. Here, runtime libraries 205 can convert API calls to commands for execution, configuration, and/or control of the DP accelerators. In one embodiment, runtime libraries 205 provides a predetermined set of (e.g., predefined) kernels for execution by the user applications.

Host machine 104 can include memory safe applications 207 which are implemented using memory safe languages such as Rust, and GoLang, etc. These memory safe applications running on memory safe Linux releases, such as MesaLock Linux, can further protect system 200 from data confidentiality and integrity attacks. However, the operating systems may be any Linux distributions, UNIX, Windows OS, or Mac OS.

The host machine can be set up as follows: A memory-safe Linux distribution is installed onto a system equipped with TPM secure boot. The installation can be performed offline during a manufacturing or preparation stage. The installation can also ensure that applications of a user space of the host system are programmed using memory-safe programming languages. Ensuring other applications running on host system 104 to be memory-safe applications can further mitigate potential confidentiality and integrity attacks on host system 104.

After installation, the system can then boot up through a TPM-based secure boot. The TPM secure boot ensures only a signed/certified operating system and accelerator driver are launched in a kernel space that provides the accelerator services. In one embodiment, the operating system can be loaded through a hypervisor. Note, a hypervisor or a virtual machine manager is a computer software, firmware, or hardware that creates and runs virtual machines. Note, a kernel space is a declarative region or scope where kernels (i.e., a predetermined set of (e.g., predefined) functions for execution) are identified to provide functionalities and services to user applications. In the event that integrity of the system is compromised, TPM secure boot may fail to boot up and instead shuts down the system.

After secure boot, runtime libraries 205 runs and creates TEE 201, which places runtime libraries 205 in a trusted memory space associated with CPU 213. Next, user application 203 is launched in TEE 201. In one embodiment, user application 203 and runtime libraries 205 are statically linked and launched together. In another embodiment, runtime 205 is launched in TEE first and then user application 205 is dynamically loaded in TEE 201. In another embodiment, user application 205 is launched in TEE first, and then runtime 205 is dynamically loaded in TEE 201. Note, statically linked libraries are libraries linked to an application at compile time. Dynamic loading can be performed by a dynamic linker. Dynamic linker loads and links shared libraries for running user applications at runtime. Here, user applications 203 and runtime libraries 205 within TEE 201 are visible to each other at runtime, e.g., all process data are visible to each other. However, external access to the TEE is denied.

In one embodiment, the user application can only call a kernel from a set of kernels as predetermined by runtime libraries 205. In another embodiment, user application 203 and runtime libraries 205 are hardened with side channel free algorithm to defend against side channel attacks such as cache-based side channel attacks. A side channel attack is any attack based on information gained from the implementation of a computer system, rather than weaknesses in the implemented algorithm itself (e.g. cryptanalysis and software bugs). Examples of side channel attacks include cache attacks which are attacks based on an attacker's ability to monitor a cache of a shared physical system in a virtualized environment or a cloud environment. Hardening can include masking of the cache, outputs generated by the algorithms to be placed on the cache. Next, when the user application finishes execution, the user application terminates its execution and exits from the TEE.

In one embodiment, TEE 201 and/or memory safe applications 207 is not necessary, e.g., user application 203 and/or runtime libraries 205 is hosted in an operating system environment of host 104.

In one embodiment, the set of kernels include obfuscation kernel algorithms. In one embodiment, the obfuscation kernel algorithms can be symmetric or asymmetric algorithms. A symmetric obfuscation algorithm can obfuscate and de-obfuscate data communications using a same algorithm. An asymmetric obfuscation algorithm requires a pair of algorithms, where a first of the pair is used to obfuscate and the second of the pair is used to de-obfuscate, or vice versa. In another embodiment, an asymmetric obfuscation algorithm includes a single obfuscation algorithm used to obfuscate a data set but the data set is not intended to be de-obfuscated, e.g., there is absent a counterpart de-obfuscation algorithm. Obfuscation refers to obscuring of an intended meaning of a communication by making the communication message difficult to understand, usually with confusing and ambiguous language. Obscured data is harder and more complex to reverse engineering. An obfuscation algorithm can be applied before data is communicated to obscure (cipher/decipher) the data communication reducing a chance of eavesdrop. In one embodiment, the obfuscation algorithm can further include an encryption scheme to further encrypt the obfuscated data for an additional layer of protection. Unlike encryption, which may be computationally intensive, obfuscation algorithms may simplify the computations. Some obfuscation techniques can include but are not limited to, letter obfuscation, name obfuscation, data obfuscation, control flow obfuscation, etc. Letter obfuscation is a process to replace one or more letters in a data with a specific alternate letter, rendering the data meaningless. Examples of letter obfuscation include a letter rotate function, where each letter is shifted along, or rotated, a predetermine number of places along the alphabet. Another example is to reorder or jumble up the letters based on a specific pattern. Name obfuscation is a process to replace specific targeted strings with meaningless strings. Control flow obfuscation can change the order of control flow in a program with additive code (insertion of dead code, inserting uncontrolled jump, inserting alternative structures) to hide a true control flow of an algorithm/AI model.

In summary, system 200 provides multiple layers of protection for DP accelerators (for data transmissions including machine learning models, training data, and inference outputs) from loss of data confidential and integrity. System 200 can include a TPM-based secure boot protection layer, a TEE protection layer, and a kernel validation/verification layer. Furthermore, system 200 can provide a memory safe user space by ensuring other applications on the host machine are implemented with memory-safe programming languages, which can further eliminate attacks by eliminating potential memory corruptions/vulnerabilities. Moreover, system 200 can include applications that use side-channel free algorithms so to defend against side channel attacks, such as cache based side channel attacks.

Lastly, runtime can provide obfuscation kernel algorithms to obfuscate data communication between a host and DP accelerators. In one embodiment, the obfuscation can be pair with a cryptography scheme. In another embodiment, the obfuscation is the sole protection scheme and cryptography-based hardware is rendered unnecessary for the DP accelerators.

Figure 3:
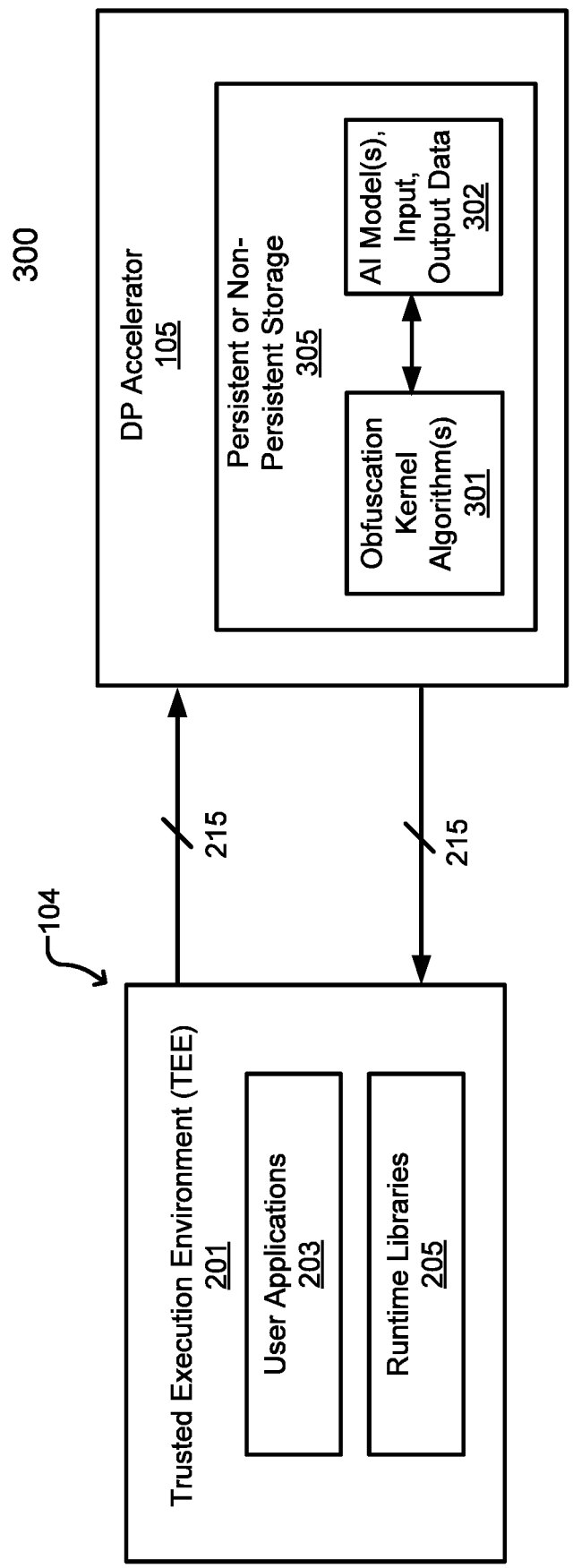
FIG. 3 is a block diagram illustrating an example of a host in communication with a DP accelerator according to one embodiment.

FIG. 3 is a block diagram illustrating an example of a host in communication with a DP accelerator according to one embodiment. Referring to FIG. 3, system 300 can include TEE 201 of host 104 in communication with DP accelerator 105. DP accelerator includes persistent or non-persistent storage 305. Storage 305 can include a storage space for obfuscation kernel algorithms 301 and a storage space for other data (e.g., AI models, inputs/output data 302). User applications 203 of host 104 can establish obscured communication (e.g., obfuscated and/or encrypted) channel(s) 215 with DP accelerator 105. Host 104 can establish a obscured communication channel by generating an obfuscation kernel algorithm (as part of kernels runtime library 205). Host 104 then sends a DP accelerator (e.g., DP accelerator 105) the obfuscation kernel algorithm for the DP accelerator to obfuscate or de-obfuscate any data packets passing through communication channel 215. In another embodiment, outgoing communication data packets from host 104 on channel 215 uses a first obfuscation algorithm while incoming data from host 104 on channel uses a second obfuscation algorithm different than the first. In another embodiment, when the communication channel drops or terminates, the obfuscation algorithm may re-establish, where a current or a new obfuscation algorithm is generated by host 104 for the communication channel. In another embodiment, the obfuscation algorithm(s)/scheme(s) for channel 215 is different than the obfuscation scheme(s) for other channels between host 104 and other DP accelerators (e.g., DP accelerators 106-107). In one embodiment, host 104 includes an obfuscation interface that stores the obfuscation algorithms for each communication sessions of DP accelerators 105-107. Although the obscured communication is shown between host 104 and DP accelerator 105, the obscured communication (e.g., obfuscation) can be applied to other communication channels, such as a communication channel between clients 101-102 and host 104.

Figure 4:
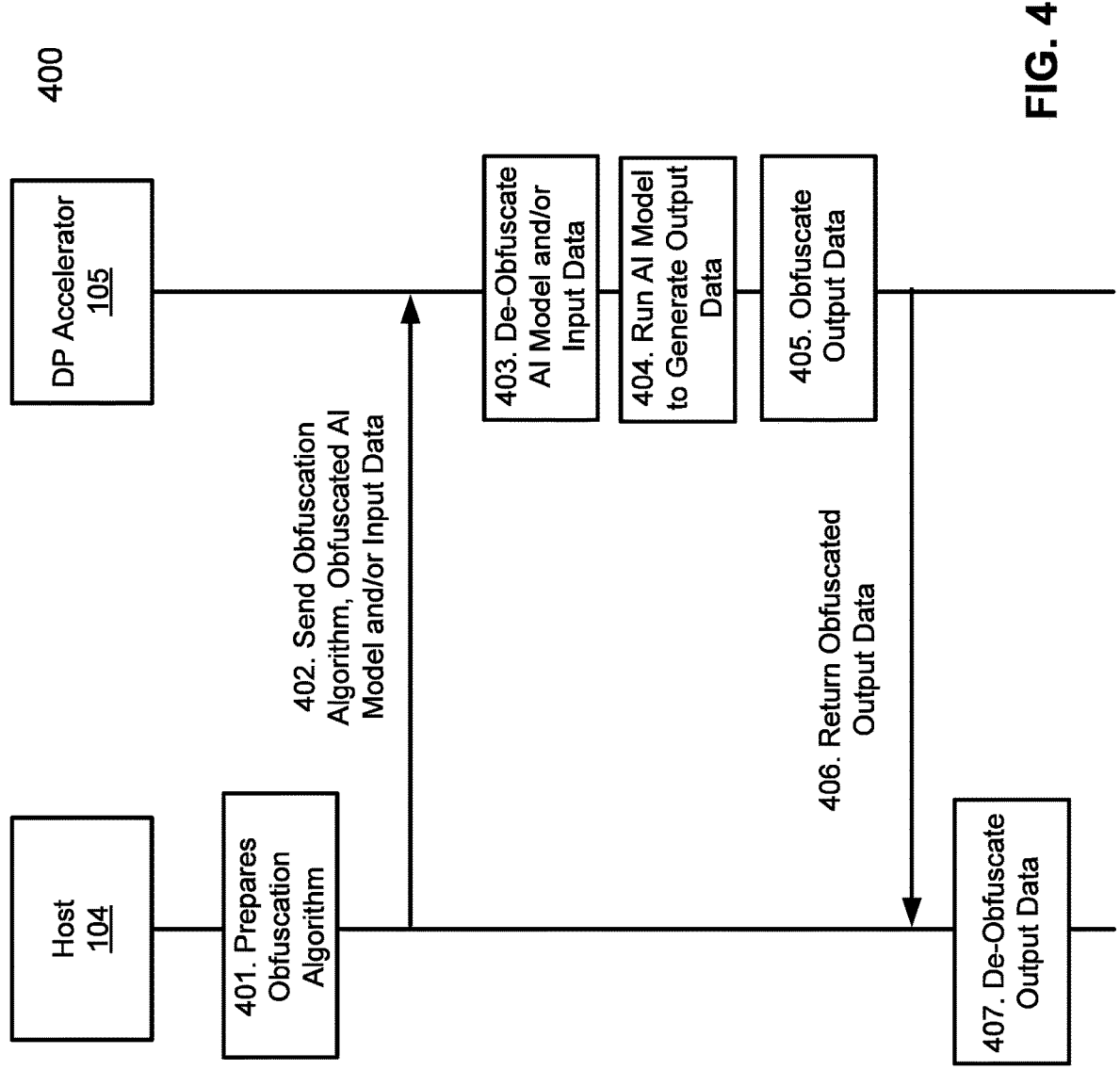
FIG. 4 is a flow chart illustrating an example of an obfuscation communication between a host and a DP accelerator according to one embodiment.

FIG. 4 is a flow chart illustrating an example of an obfuscation communication protocol between a host and a DP accelerator according to one embodiment. Referring to FIG. 4, operations 400 for the protocol may be performed by system 100 of FIG. 1 or system 300 of FIG. 3. In one embodiment, a client device, such as client device (e.g., a client/user) 101, sends an AI model inference/training request to host 104. The request can be a request for resources or services (such as a request for big data analysis, modeling, machine learning/training tasks, etc.) that can be fulfilled by one or more DP accelerators of host 104. In one embodiment, at operation 401, host 104 prepares an obfuscation algorithm to establish an obscured (e.g., obfuscated) communication channel. The obfuscation algorithm can be any types of obfuscation algorithms and can be symmetric or asymmetric. At operation 402, host 104 sends the obfuscation algorithm to DP accelerator 105 to establish an obscured (e.g., obfuscated) communication channel between host 104 and DP accelerator 105. Host 104 then obfuscate a payload (e.g., AI model and/or input data) and sends the obfuscated payload (e.g., data) with the obfuscation algorithm to DP accelerator 105. In another embodiment, the obfuscation algorithm may be transmitted via a dedicated channel (e.g., separate from the data) that may or may not be encrypted. In another embodiment, host 104 sends the obfuscated data at a time setting different from the obfuscation algorithm.

At operation 403, once DP accelerator 105 receives both the obfuscation kernel algorithm and the obfuscated data. DP accelerator 105 de-obfuscates the obfuscated data using the obfuscation algorithm to obtain the underlying data, e.g., AI models and/or input data (for AI inference or training). At operation 404, if the request is an AI inference request, DP accelerator executes the AI model(s) using the input data to generate inference outputs. If the request is a training request, DP accelerator initiates a training session for the AI models based on training input data. At operation 405, DP accelerator 105 obfuscates the generated outputs using the obfuscation algorithm. At operation 406, DP returns the obfuscated outputs to host 104. At operation 407, host 104 de-obfuscates the obfuscated outputs to obtain the underlying outputs. Thus, the communication between host 104 and DP accelerator 105 is obscured from intruders/eavesdrops.

Figure 5:
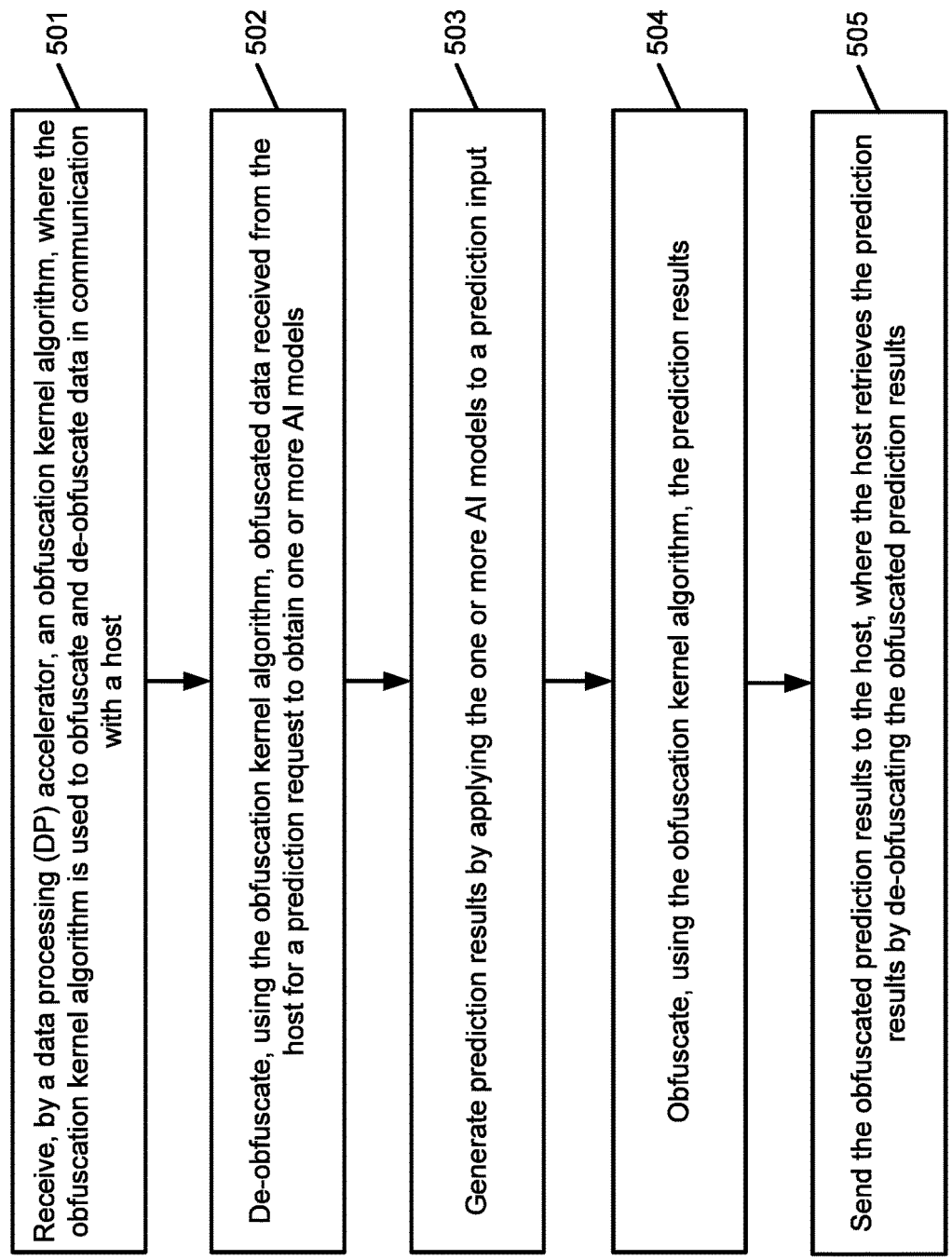
FIG. 5 is a flow diagram illustrating an example of a method according to one embodiment.

FIG. 5 is a flow diagram illustrating an example of a method according to one embodiment. Process 500 may be performed by processing logic which may include software, hardware, or a combination thereof. For example, process 500 may be performed by a DP accelerator, such as DP accelerator 105 of FIG. 1. Referring to FIG. 5, at block 501, processing logic receives, an obfuscation kernel algorithm, where the obfuscation kernel algorithm is used to obfuscate and de-obfuscate data in communication with a host. At block 502, processing logic de-obfuscates, using the obfuscation kernel algorithm, obfuscated data received from the host for a prediction request to obtain one or more AI models. At block 503, processing logic generates prediction results by applying the one or more AI models to a prediction input. At block 504, processing logic obfuscates, using the obfuscation kernel algorithm, the prediction results. At block 505, processing logic sends the obfuscated prediction results to the host, where the host retrieves the prediction results by de-obfuscating the obfuscated prediction results.

In one embodiment, the obfuscation kernel algorithm is generated by the host. In one embodiment, the obfuscation kernel algorithm is received on a dedicated communication channel different than a data channel for communicating the obfuscated data.

In one embodiment, the obfuscated data includes training input data and the one or more AI models is trained using the training input data. In one embodiment, the obfuscation kernel algorithm is a symmetric algorithm such that the same algorithm is used for both de-obfuscation and obfuscation. In one embodiment, the obfuscation kernel algorithm is a name based obfuscation algorithm.

In one embodiment, processing logic further receives a request for one or more AI models from the host; obfuscates the requested one or more AI models; and sends the obfuscated AI models to the host, where the host is to retrieve the AI models by de-obfuscating the obfuscated AI models.

Figure 6:
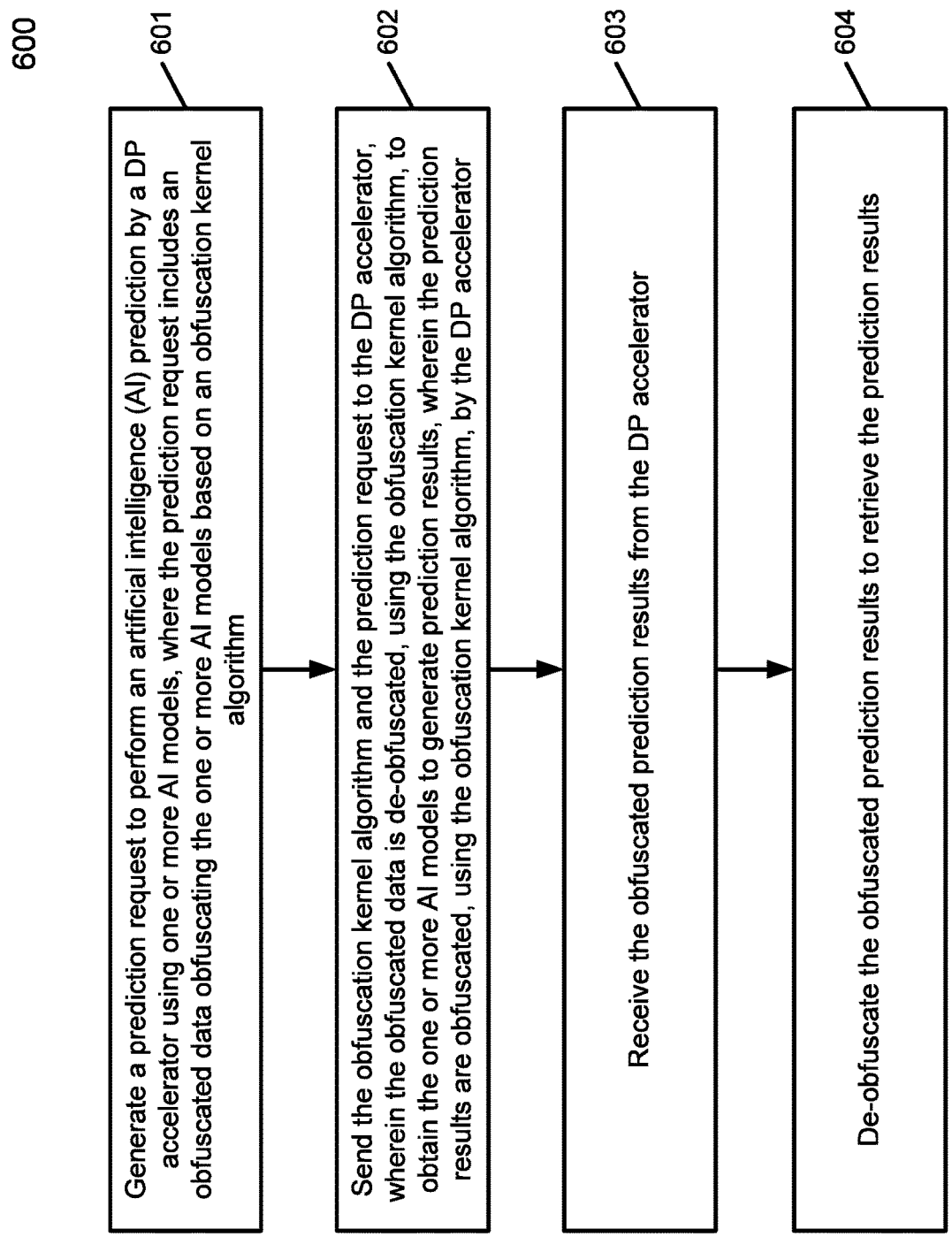
FIG. 6 is a flow diagram illustrating an example of a method according to one embodiment.

FIG. 6 is a flow diagram illustrating an example of a method according to one embodiment. Process 600 may be performed by processing logic which may include software, hardware, or a combination thereof. For example, process 600 may be performed by host 104 of FIG. 1. Referring to FIG. 6, at block 601, processing logic generates a prediction request to perform an artificial intelligence (AI) prediction by a data processing (DP) accelerator using one or more AI models, where the prediction request includes an obfuscated data obfuscating the one or more AI models based on an obfuscation kernel algorithm. At block 602, processing logic sends the obfuscation kernel algorithm and the prediction request to the DP accelerator, where the obfuscated data is de-obfuscated, using the obfuscation kernel algorithm, to obtain the one or more AI models to generate prediction results, where the prediction results are obfuscated, using the obfuscation kernel algorithm, by the DP accelerator. At block 603, processing logic receives the obfuscated prediction results from the DP accelerator. At block 604, processing logic de-obfuscating the obfuscated prediction results to retrieve the prediction results.

In one embodiment, the obfuscation kernel algorithm is generated by the host. In one embodiment, the obfuscation kernel algorithm is received on a dedicated communication channel different than a data channel for communicating the obfuscated data. In one embodiment, the obfuscated data includes training input data and the one or more AI models is trained using the training input data. In one embodiment, the obfuscation kernel algorithm is a symmetric algorithm such that the same algorithm is used for both de-obfuscation and obfuscation. In another embodiment, the obfuscation kernel algorithm is a name based obfuscation algorithm.

In one embodiment, processing logic further generates a request to retrieve one or more AI models from the DP accelerator; sends the request to the DP accelerator; receives obfuscated data representing the one or more AI models from the DP accelerator; and de-obfuscates the obfuscated AI models to retrieve the AI models.

Figure 7:
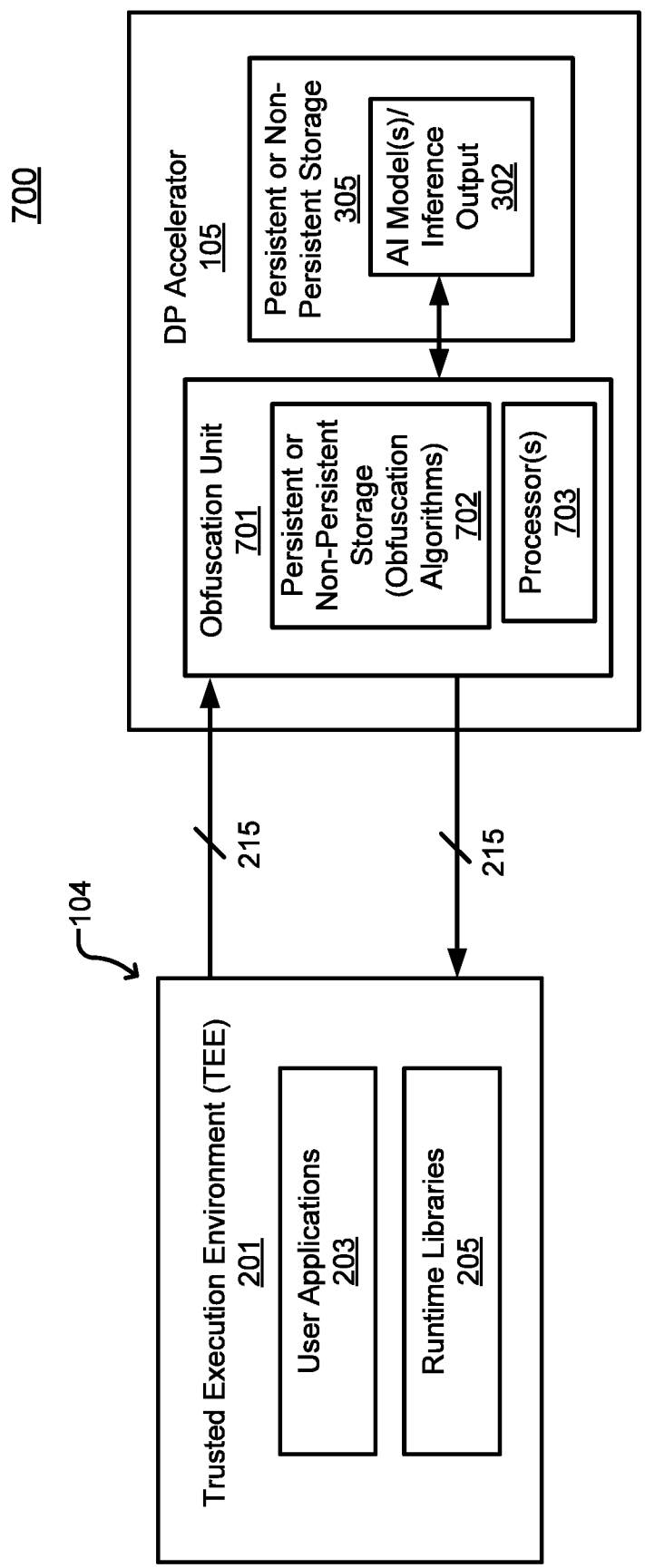
FIG. 7 is a block diagram illustrating an example of a host in communication with a DP accelerator with an obfuscation unit according to one embodiment.

FIG. 7 is a block diagram illustrating an example of a host in communication with a DP accelerator with an obfuscation unit according to one embodiment. Referring to FIGS. 7 and 7, system 700 can be similar to system 300 of FIG. 3, except that system 700 includes obfuscation unit 701. Obfuscation unit 701 can be a dedicated hardware module that includes persistent or non-persistent storage 702 with a number of obfuscation algorithms. The obfuscation algorithms may be pre-installed during a manufacturing or a preparation stage. In one embodiment, the obfuscation algorithms are previously received from host 104. In one embodiment, obfuscation unit 701 includes one or more processors 703 to perform obfuscation/de-obfuscation functions. Because obfuscation can be processed by obfuscation unit 701 as a dedicated processing, additional processing resources from DP accelerator 105 is not required. This is useful if DP accelerator 105 is servicing a client or is busy performing a training and cannot lend resources. Moreover, because obfuscation unit 701 includes the obfuscation algorithms, an obfuscation algorithm may or may not be communicated from host 104 to DP accelerator for the communication session.

In one embodiment, host 104 includes the corresponding obfuscation algorithms supported by obfuscation unit 701. In one embodiment, when host 104 sends obfuscated data, host 104 sends an indicator indicating a corresponding obfuscation algorithm used to obfuscate the data. The indicators (or selectors or obfuscation algorithm selections) may be previously communicated from DP accelerator 105 to host 104 listing the available obfuscation algorithm supported by DP accelerator 105. If one embodiment, the indicator for obfuscation algorithm selection may or may not be encrypted. In another embodiment, the selector may be sent in a channel separate from a data channel obfuscating the data.

Figure 8:
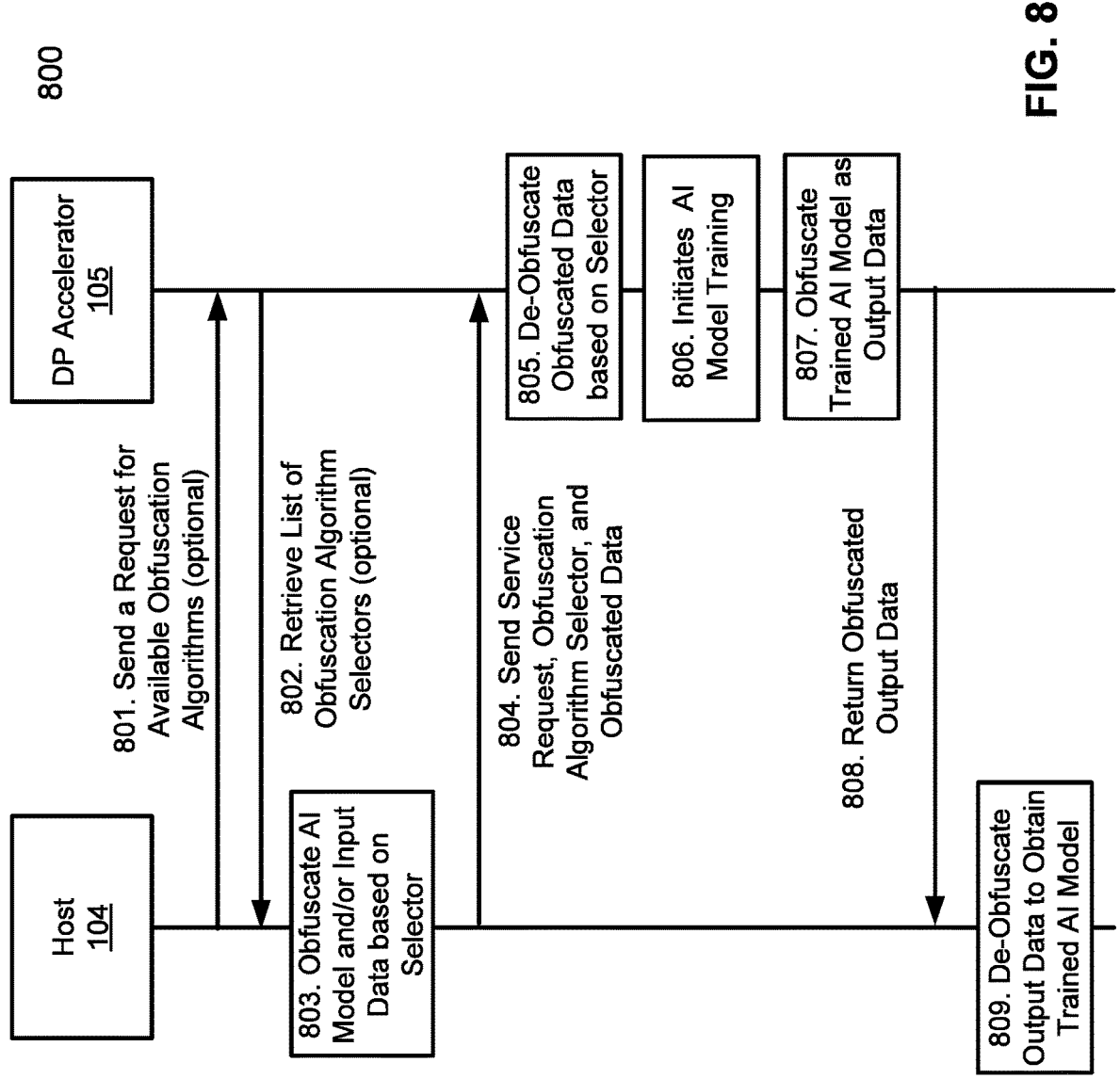
FIG. 8 is a flow chart illustrating an example of an obfuscation communication between a host and a DP accelerator according to one embodiment.

FIG. 8 is a flow chart illustrating an example of an obfuscation communication between a host and a DP accelerator according to one embodiment. Referring to FIG. 8, operations 800 for the protocol may be performed by system 100 of FIG. 1 or system 700 of FIG. 7. In one embodiment, a client device, such as client device 101, sends an AI model inference/training request to host 104. The request can be a request for resources or services (such as a request for big data analysis, modeling, machine learning/training tasks, etc.) that can be fulfilled by one or more DP accelerators. Host 104 then communicates with DP accelerator 105 to fulfill the request. In one embodiment, at operation 801, to determine the available obfuscation algorithms supported by an obfuscation unit of DP accelerator 105, host 104 sends a request for available obfuscation algorithms. At operation 802, DP accelerator 105 returns a list of obfuscation algorithm selectors in response to the request. In one embodiment, operations 801-802 are optional. Based on the list of selectors, at operation 803, host 104 selects one of the obfuscation algorithms and obfuscates a service request payload (e.g., AI models and/or input data) using the obfuscation algorithm selector to prepare a service request. At operation 804, host 104 sends the algorithm selector along with the service request and obfuscated data to DP accelerator 105. In another embodiment, if obfuscation unit 701 of DP accelerator 105 includes a default selector or only supports one obfuscation algorithm, an algorithm selector may be an optional parameter and is not necessarily communicated between host 104 and DP accelerator 105.

At operation 805, DP accelerator 105 de-obfuscates the obfuscated data based on the algorithm selector to obtain the AI model and/or input data. At operation 806, if the request is a training request, DP accelerator initiates a training session for the AI model.

In one embodiment, at operation 807, once training is complete, DP accelerator 105 obfuscate an output data (e.g., a training completion receipt or the trained AI model) based on the selector. At operation 808, DP accelerator 105 returns the obfuscated output data to host 104. At operation 809, host 104 de-obfuscates the data based on the selector to obtain the training completion data or the trained AI model.

Figure 9:
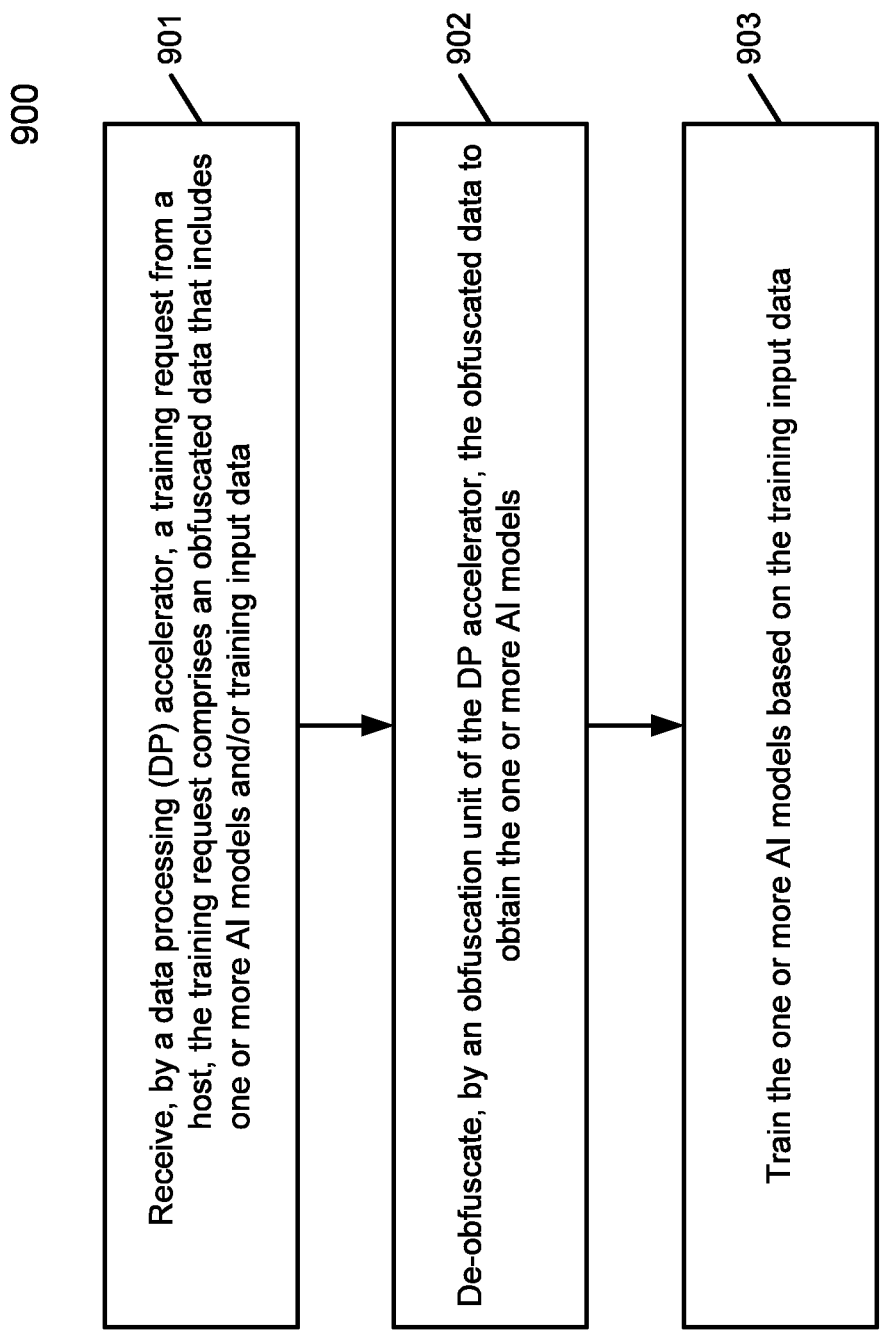
FIG. 9 is a flow diagram illustrating an example of a method according to one embodiment.

FIG. 9 is a flow diagram illustrating an example of a method according to one embodiment. Process 900 may be performed by processing logic which may include software, hardware, or a combination thereof. For example, process 900 may be performed by a DP accelerator, such as DP accelerator 105 of FIG. 7. Referring to FIG. 9, at block 901, processing logic receives a training request from a host, the training request includes an obfuscated data that includes one or more AI models and/or training input data. At block 902, processing logic de-obfuscates, by an obfuscation unit of the DP accelerator, the obfuscated data to obtain the one or more AI models. At block 903, processing logic trains the one or more AI models based on the training input data.

In one embodiment, processing logic further selects one of a number of obfuscation algorithms supported by the obfuscation unit, and processes, by a processor of the obfuscation unit, to de-obfuscate obfuscated data based on the selected obfuscation algorithm. In one embodiment, the processor of the obfuscation unit is separate from a processor of the DP accelerator such that an obfuscation algorithm can be executed concurrently with execution of an AI model training.

In one embodiment, the obfuscated data includes training input data and the AI model is trained based on the training input data. In one embodiment, the obfuscation kernel algorithm is a symmetric algorithm such that the same algorithm is used for both de-obfuscation and obfuscation. In one embodiment, the obfuscation kernel algorithm is a control flow obfuscation algorithm.

In one embodiment, processing logic further receives a request for one or more AI models from the host; obfuscates, by the obfuscation unit, the requested one or more AI models; and sends the obfuscated AI models to the host, where the host is to retrieve the AI models by de-obfuscating the obfuscated AI models.

Figure 10:
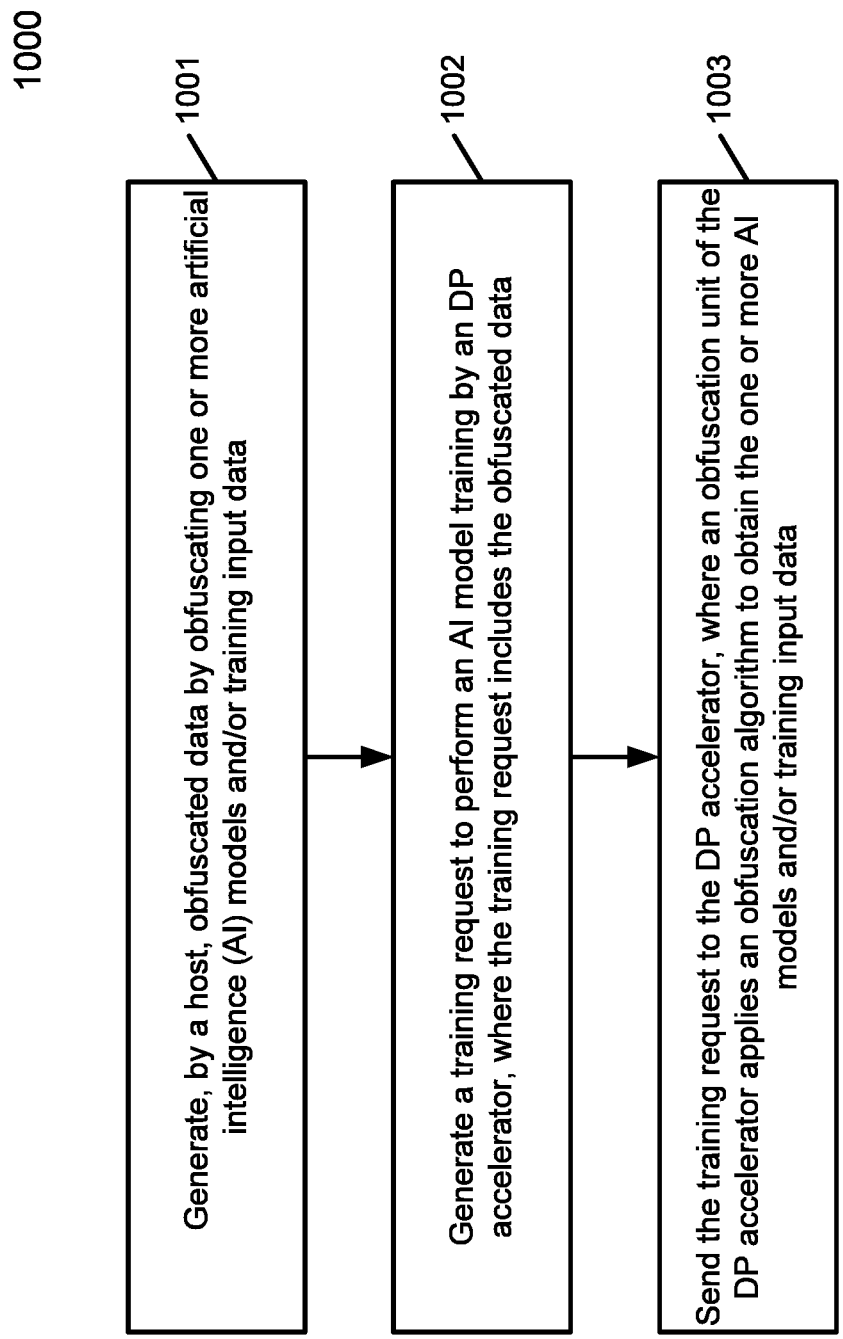
FIG. 10 is a flow diagram illustrating an example of a method according to one embodiment.

FIG. 10 is a flow diagram illustrating an example of a method according to one embodiment. Process 1000 may be performed by processing logic which may include software, hardware, or a combination thereof. For example, process 1000 may be performed by host 104 of FIG. 7. Referring to FIG. 10, at block 1001, processing logic generates obfuscated data by obfuscating one or more artificial intelligence (AI) models and/or training input data. At block 1002, processing logic generates a training request to perform an AI model training by a DP accelerator, where the training request includes the obfuscated data. At block 1003, processing logic sends the training request to the DP accelerator, where an obfuscation unit of the DP accelerator applies an obfuscation algorithm to obtain the one or more AI models and/or training input data, where the one or more AI models is trained using the training input data.

In one embodiment, processing logic further receives a training result from the DP accelerator. In one embodiment, processing logic further selects the obfuscation algorithm as one of a number of obfuscation algorithms supported by the obfuscation unit of the DP accelerator, where obfuscation or de-obfuscation is processed by a processor of the obfuscation unit of the DP accelerator using the selected obfuscation algorithm.

In one embodiment, the processor of the obfuscation unit is separate from a processor of the DP accelerator such that an obfuscation algorithm can be executed concurrently with execution of an AI model training. In one embodiment, the obfuscation algorithm is a symmetric algorithm such that the same algorithm is used for both de-obfuscation and obfuscation. In one embodiment, the obfuscation kernel algorithm is a control flow obfuscation algorithm.

In one embodiment, processing logic further generates a request to retrieve one or more AI models from the DP accelerator; receives an obfuscated data representing obfuscated one or more AI models from the DP accelerator, where the host by de-obfuscating the obfuscated AI model; receives an indication for an obfuscation algorithm from a number of obfuscation algorithm supported by the obfuscation unit of the DP accelerator; and de-obfuscates the obfuscated AI models to retrieve the AI models based on the indication.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 11:
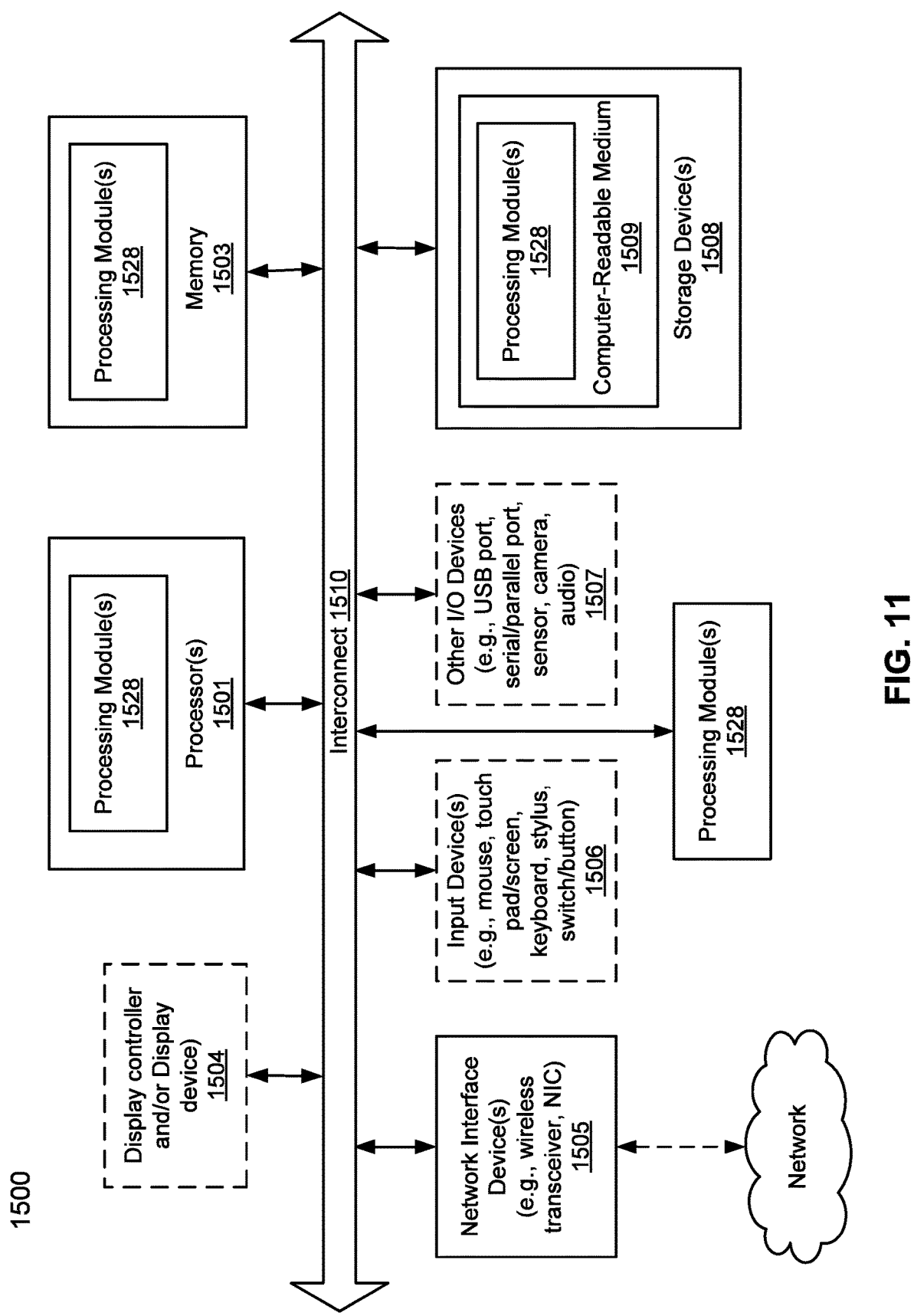
FIG. 11 is a block diagram illustrating a data processing system according to one embodiment.

FIG. 11 is a block diagram illustrating an example of a data processing system which may be used with one embodiment of the invention. For example, system 1500 may represent any of data processing systems described above performing any of the processes or methods described above, such as, for example, host 104 or DP accelerators 105-107 as described above.

System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a number of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as, for example, host 104 of FIG. 1 or DP accelerator 105 of FIG. 3 or 7, as described above. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques shown in the figures can be implemented using code and data stored and executed on one or more electronic devices. Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals).

The processes or methods depicted in the preceding figures may be performed by processing logic that comprises hardware (e.g. circuitry, dedicated logic, etc.), firmware, software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method to de-obfuscate data, the method comprising:
receiving, by a data processing (DP) accelerator, an obfuscation kernel algorithm, wherein the obfuscation kernel algorithm is used to obfuscate and de-obfuscate data in communication with a host over a link;
de-obfuscating, using the obfuscation kernel algorithm, obfuscated data received from the host for a prediction request to obtain one or more artificial intelligence (AI) models, wherein the obfuscated data comprises the one or more AI models that are obfuscated based on the obfuscation kernel algorithm and the obfuscated one or more AI models are sent by the host for the prediction request, wherein the obfuscation kernel algorithm includes a symmetric algorithm or an asymmetric algorithm to obscure the one or more AI models in communication, wherein the obfuscation kernel algorithm comprises at least one of: letter obfuscation, name obfuscation, data obfuscation, or control flow obfuscation;
generating prediction results by applying the one or more AI models to a prediction input;
obfuscating, using the obfuscation kernel algorithm, the prediction results; and
sending the obfuscated prediction results to the host over the link, wherein the host retrieves the prediction results by de-obfuscating the obfuscated prediction results.

2. The method of claim 1, wherein the obfuscation kernel algorithm is generated by the host.

3. The method of claim 1, wherein the obfuscation kernel algorithm is received on a dedicated communication channel different than a data channel for communicating the obfuscated data.

4. The method of claim 1, wherein the obfuscated data comprises training input data and the one or more AI models is trained using the training input data.

5. The method of claim 1, wherein the obfuscation kernel algorithm is a symmetric algorithm such that the same algorithm is used for both de-obfuscation and obfuscation.

6. The method of claim 1, wherein the obfuscation kernel algorithm is a name based obfuscation algorithm.

7. The method of claim 1, further comprising:
receiving a request for one or more AI models from the host;
obfuscating the requested one or more AI models; and
sending the obfuscated AI models to the host, wherein the host is to retrieve the AI models by de-obfuscating the obfuscated AI models.

8. A method to obfuscate data, the method comprising:
generating, at a host, a prediction request to perform an artificial intelligence (AI) prediction by a data processing (DP) accelerator using one or more AI models, wherein the prediction request includes an obfuscated data obfuscating the one or more AI models based on an obfuscation kernel algorithm, wherein the obfuscation kernel algorithm includes a symmetric algorithm or an asymmetric algorithm to obscure the one or more AI models in communication, wherein the obfuscation kernel algorithm comprises at least one of: letter obfuscation, name obfuscation, data obfuscation, or control flow obfuscation;
sending the obfuscation kernel algorithm and the prediction request to the DP accelerator over a link, wherein the prediction request includes the obfuscated one or more AI models and the obfuscated data is de-obfuscated by the DP accelerator, using the obfuscation kernel algorithm, to obtain the one or more AI models to generate prediction results, wherein the prediction results are obfuscated, using the obfuscation kernel algorithm, by the DP accelerator;
receiving the obfuscated prediction results from the DP accelerator over the link; and
de-obfuscating the obfuscated prediction results to retrieve the prediction results.

9. The method of claim 8, wherein the obfuscation kernel algorithm is generated by the host.

10. The method of claim 8, wherein the obfuscation kernel algorithm is transmitted on a dedicated communication channel different than a data channel for communicating the obfuscated data.

11. The method of claim 8, wherein the obfuscated data comprises training input data and the one or more AI models is trained using the training input data.

12. The method of claim 8, wherein the obfuscation kernel algorithm is a symmetric algorithm such that the same algorithm is used for both de-obfuscation and obfuscation.

13. The method of claim 8, wherein the obfuscation kernel algorithm is a name based obfuscation algorithm.

14. The method of claim 8, further comprising:

generating a request to retrieve one or more AI models from the DP accelerator;

sending the request to the DP accelerator;

receiving obfuscated data representing the one or more AI models from the DP accelerator; and de-obfuscating the obfuscated AI models to retrieve the AI models.

15. A non-transitory machine-readable medium having instructions stored therein, which when executed by a processor, cause the processor to perform operations, the operations comprising:

receiving, by a data processing (DP) accelerator, an obfuscation kernel algorithm, wherein the obfuscation kernel algorithm is used to obfuscate and de-obfuscate data in communication with a host over a link;

de-obfuscating, using the obfuscation kernel algorithm, obfuscated data received from the host for a prediction request to obtain one or more artificial intelligence (AI) models, wherein the obfuscated data comprises the one or more AI models that are obfuscated based on the obfuscation kernel algorithm and the obfuscated one or more AI models are sent by the host for the prediction request, wherein the obfuscation kernel algorithm includes a symmetric algorithm or an asymmetric algorithm to obscure the one or more AI models in communication, wherein the obfuscation kernel algorithm comprises at least one of: letter obfuscation, name obfuscation, data obfuscation, or control flow obfuscation;

generating prediction results by applying the one or more AI models to a prediction input;

obfuscating, using the obfuscation kernel algorithm, the prediction results; and sending the obfuscated prediction results to the host, wherein the host retrieves the prediction results by de-obfuscating the obfuscated prediction results.

16. The non-transitory machine-readable medium of claim 15, wherein the obfuscation kernel algorithm is generated by the host.

17. The non-transitory machine-readable medium of claim 15, wherein the obfuscation kernel algorithm is received on a dedicated communication channel different than a data channel for communicating the obfuscated data.

18. The non-transitory machine-readable medium of claim 15, wherein the obfuscated data comprises training input data and the one or more AI models is trained using the training input data.

19. The non-transitory machine-readable medium of claim 15, wherein the obfuscation kernel algorithm is a symmetric algorithm such that the same algorithm is used for both de-obfuscation and obfuscation.

20. The non-transitory machine-readable medium of claim 15, wherein the obfuscation kernel algorithm is a name based obfuscation algorithm.

\* \* \* \* \*